Feb. 21, 1928.

G. H. DUPONT 1,659,727

APPARATUS FOR DISTILLING CRUDE RESINS

Filed Dec. 5, 1924    2 Sheets-Sheet 2

Inventor.
Georges Honoré Dupont.
Attorney.

Patented Feb. 21, 1928.

1,659,727

UNITED STATES PATENT OFFICE.

GEORGES HONORÉ DUPONT, OF GIRONDE, FRANCE.

APPARATUS FOR DISTILLING CRUDE RESINS.

Application filed December 5, 1924, Serial No. 754,080, and in France May 24, 1924.

The continuous distillation of crude resin is difficult by reason of the viscosity of the resin, the amount of water in the resin which tends to make it frothy and the bad heat conducting qualities of resin.

The present invention overcomes these difficulties the apparatus being arranged so that the resin is initially heated so as to completely liquefy and dehydrate it before it is introduced into the distillation apparatus proper.

The apparatus comprises a series of similar internal elements the number of which can vary in accordance with the height of the apparatus as a whole.

The resin is fed into the double jacket $A^1$ of a heater A which is heated by the vapors coming from the distilling apparatus. The resin flows from the heater A over a heating plate B where it is completely liquefied and dehydrated before passing into the chamber C at the top of the distilling tower.

Figure 1:
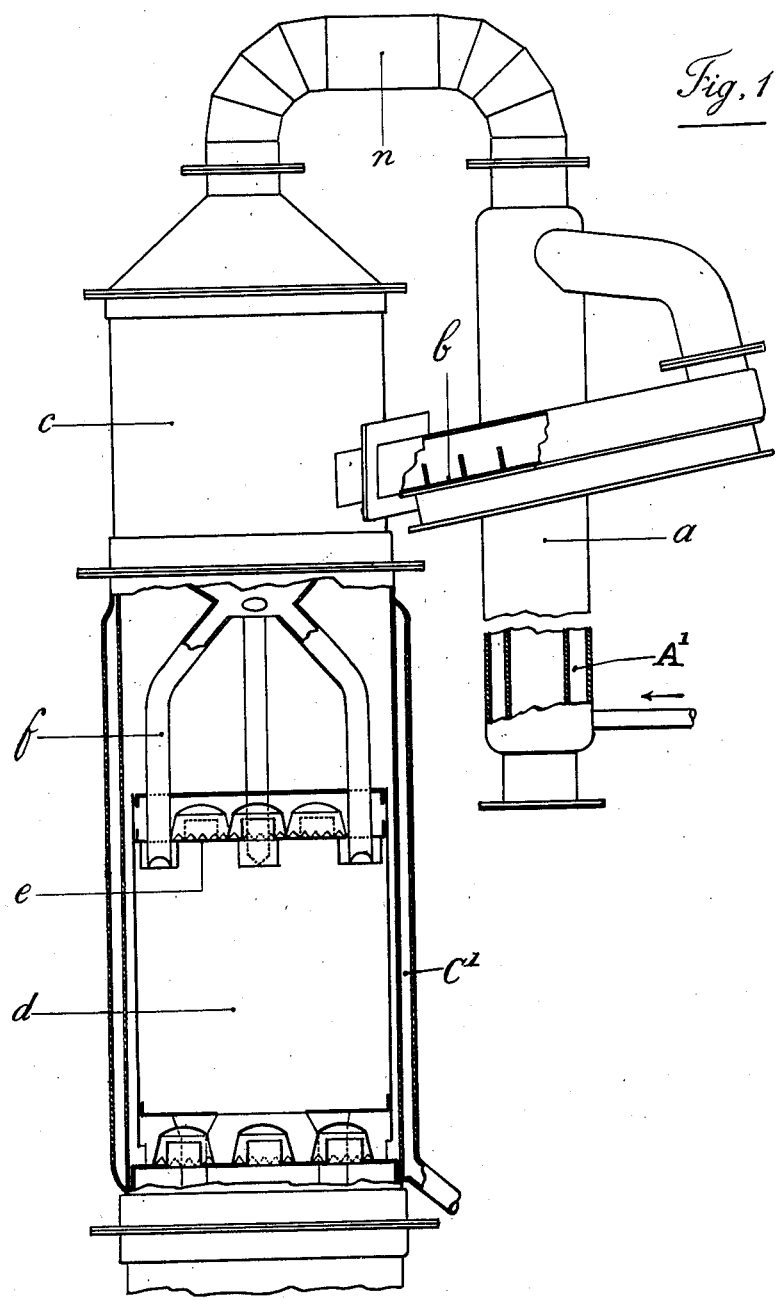
Fig. 1 is an elevation with part shown in section of the upper part of a form of construction of the apparatus.
Figure 2:
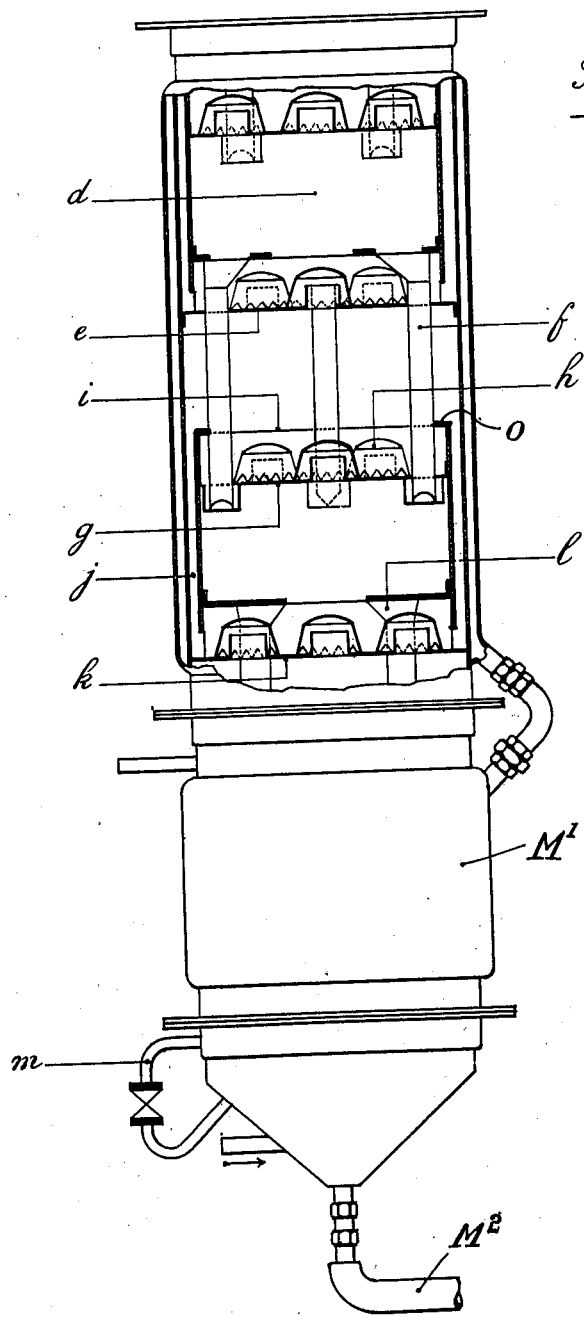
Fig. 2 is a similar view of the lower part of the apparatus shown in Fig. 1.

This tower has a double jacket supplied with steam and contains a number of elements similar to D in Fig. 2 which by their construction cause the resin to flow in a thin layer over the inner surface of the steam jacket $C^1$.

The resin flowing on to the upper plate E through the tubes F arrives on the plate G where it is submitted to the action of rising vapors passing through the bells H.

The level of the resin rises on the plate G and it eventually passes upwardly through the central opening I of the cover O of the plate G and flows in a thin layer over the plate O and down the annular space J against the inner wall of the steam jacket $C^1$ and on to the plate K and rising on the latter flows down the overflow pipes L to the next series of tubes F the cycle being repeated, the resin flowing on to the next plate to G and so on as above described.

Steam is introduced into a chamber M' at the base of the tower at M and rises from plate to plate and extracts the turpentine from the resin and on reaching the top of the apparatus passes through conduit N. $M^2$ is a conduit for the evacuation of chamber M'.

An apparatus not illustrated on the drawing allows of treating the vapor for the purpose of extracting the resin therein and consequently prevents waste of the resin.

Further there can be added to the apparatus on the vapor collector in continuation of the heater A a purifier acting in a continuous manner to purify the spirit passing out of the apparatus by separating out the heavy products so as to only allow the turpentine to pass.

This purifier can be constituted by a rectifying device of any kind receiving at its base the vapors to be separated and at its summit the liquids coming from the heater A and from a retarder allowing of regulating the reflux. At the base the heavy products are collected with a part of the water and at the top the separated vapors which are conducted to a condenser.

This arrangement allows without any costs of redistillation of producing certain spirits rich in sesquiturpenes and of producing in general spirits of high grade for chemical and pharmaceutical uses.

What I claim as my invention and desire to secure by Letters Patent of the United States is:—

An apparatus for distilling crude resins comprising a heater for initially heating the resin, a cylindrical metal tower, a chamber at the top of and within said tower, a chamber at the bottom of and within said tower, a heating jacket surrounding said tower, means for introducing steam into said jacket, a series of spaced superposed horizontal plates within said tower, a second series of horizontal plates having openings in their centres and forming with the plates of said first mentioned series a series of superposed compartments, tubes connecting the upper plate of a compartment with the lower plate of the next lower compartment and forming communication between the upper surface of the upper plate and cup like depressions of said lower plate, an annular passage the outer wall of which is formed by the wall of said tower, said passage forming communication between the upper plate of said next lower compartment and the lower plate of the next adjacent lower compartment said pipes and said annular passage being repeated alternately between the series of compartments, bells allowing vapors to pass upwardly therethrough supported on said lower plates of said compartments, means for evacuating said chamber at the base of said tower.

In witness whereof I have signed this specification.

GEORGES HONORÉ DUPONT.